July 17, 1962 D. S. MAISEL ET AL 3,045,048
PROCESS FOR THE PRODUCTION OF HYDROACETYL ACETONE
Filed Aug. 12, 1959
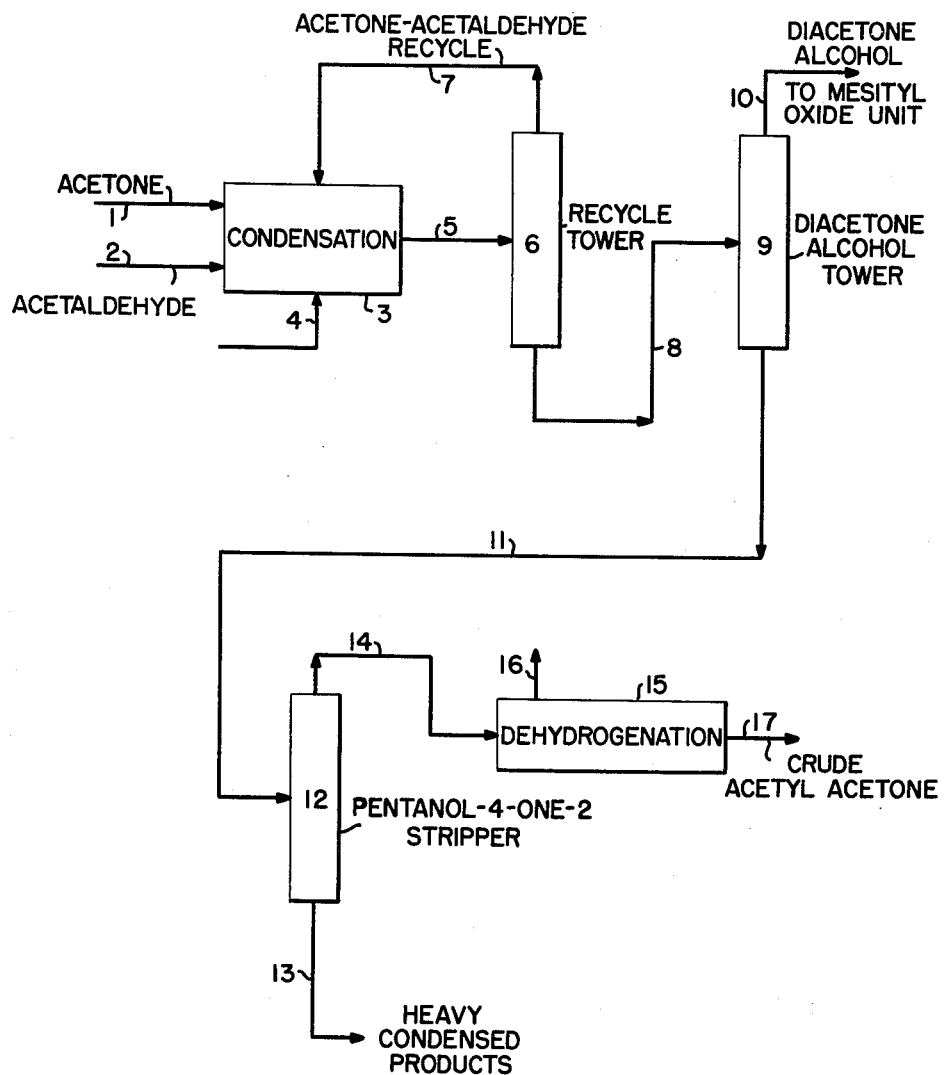
Daniel S. Maisel
John F. Ryan      Inventors
Joseph H. Cox
By Peter H. Smolka   Patent Attorney

United States Patent Office 3,045,048
Patented July 17, 1962

3,045,048
PROCESS FOR THE PRODUCTION OF
HYDROACETYL ACETONE
Daniel S. Maisel, Union, John F. Ryan, Westfield, and Joseph Hamilton Cox, Spotswood, N.J., assignors to Esso Research and Engineering Company, a corporation of Delaware
Filed Aug. 12, 1959, Ser. No. 833,325
4 Claims. (Cl. 260—594)

The present invention relates to a new and improved process for the preparation of acetylacetone from acetaldehyde and acetone and is concerned particularly with improvements in the condensation step of the process. More particularly this invention relates to the production of said acetylacetone as a coproduct obtained in very small amounts compared to the principal products in the commercial process for producing methyl isobutyl ketone. Most particularly, this invention relates to adding an extremely small amount of acetaldehyde to the acetone stream conventionally condensed in the presence of alkali solutions or solids to obtain diacetone alcohol, the precurser to said methyl isobutyl ketone. Thus, hydracetyl acetone, the precurser of acetyl acetone, is smoothly produced as a byproduct. It should be noted that methyl isobutyl ketone is an important solvent produced commercially by the process described above in extremely large quantities. Acetylacetone is likewise an important chemical, but consumption of this chemical is at most only a few percent of the consumption of methyl isobutyl ketone.

The present invention will be more clearly understood from a consideration of the chemistry involved in the present process.

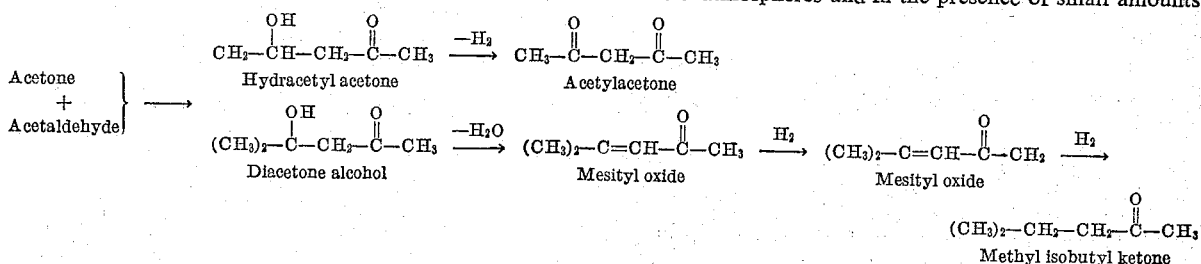

The condensation of acetone with acetaldehyde in the presence of small concentrations of alkali to obtain hydracetyl acetone and diacetone alcohol is known in the prior art. Thus, for example, in U.S. 2,792,421 the production of hydracetyl acetone preferentially to diacetone alcohol is described as obtainable by utilizing mol ratios of acetone to acetaldehyde in the range of 5–10:1. In the process described in this patent this material is then converted by dehydration to ethylidene acetone. However, in the process low yields of only 60–70% based on aldehyde (as compared to above about 90% for the present invention process) are obtained. Thus, apparently large amounts of aldol and other undesirable byproducts are obtained.

As previously discussed it is well known in the art that acetone can be commercially converted to diacetone alcohol, obtaining selectivites of above 99 wt. percent. It has now been discovered that a very economic process for the production of hydracetyl acetone can be obtained by adding extremely small amounts in the range of 0.5 to 5 mol percent, preferably 1 to 2 mol percent of acetaldehyde based on acetone, to the highly selective process for condensing acetone to diacetone alcohol. Thus, according to the process of the present invention selectivities based on aldehyde much higher than those known in U.S. 2,792,421 are obtained and additionally as compared to said process this hydracetyl acetone is obtained without separately requiring the recycle of the extremely large amounts of unconverted acetone which is required in the above described patent process. Thus, recycle of unconverted acetone is only that amount required in the acetone condensation to produce diacetone alcohol for methyl isobutyl ketone process. Therefore, as a net advantage the hydracetyl acetone is obtained without substantially any additional recycle of acetone. Additionally, by utilizing such low amounts of acetaldehyde much lower yields of byproducts such as low value aldol and high boiling materials are obtained. Thus, it is well known that aldol is also formed in any reaction of acetaldehyde with acetone, for example aldol being the major product at mol ratios of about 1:1. In the present invention the acetone is present in such overwhelmingly large amounts that the aldol formation is almost entirely suppressed so that only the desired hydracetyl acetone is produced.

It is contemplated that the present invention improved method for preparing hydracetyl acetone as a coproduct in the production of diacetone alcohol will be useful in processes for producing a wide variety of products other than the ones above described. Thus, for example, this hydracetyl acetone rather than being converted to acetylacetone may be converted by dehydration to ethylidene acetone. This ethylidene acetone is useful as an important intermediate in the production by hydrogenation of methylpropylcarbinol which itself is used in the manufacture of certain drugs including methylpropylcarbinyl urethane and ethyl a-methylbutyl barbiturate.

According to the present invention the condensation of acetone with acetaldehyde is carried out at temperatures in the range of −20 to 50° C., pressures in the range of 1 to 5 atmospheres and in the presence of small amounts of an alkali metal or barium hydroxide. The alkali metal hydroxides are preferably sodium or potassium hydroxides. All these materials may be present as solid materials supported or non-supported on a carrier or they may be present in a water solution. Amounts of water present in the condensation can be as high as 1 volume of acetone per volume of water in the case of solid catalyst, but preferably anhydrous conditions are used, and should be in the range of 4 to 0.5 volumes of acetone per volume of water in the case of dilute alkali catalyst. Alkali contents should be in the range of .005 to .08 weight percent, preferably .02 to .06 weight percent alkali based on the total reaction mixture. Conversions of acetone to diacetone alcohol are limited by equilibrium to about 12% at about 10° C. Therefore, distillation is ordinarily conducted on the product to separate unconverted acetone which is recycled in ratios based on total feed of about .9 to 1. Also, if aqueous alkali is utilized this material too may be recycled if desired. Reaction times are 0.5–5 hours, preferably 1–2 hours.

The present invention will be more clearly understood from a consideration of its use in the production of small amounts of acetylacetone as a byproduct in the commercial product of methyl isobutyl ketone. The production of methyl isobutyl ketone by the aldol condensation of acetone is an important commercial process whereby approximately 160 million pounds of this material are produced per year for use as a solvent for nitrocellulose, certain types of cellulose ethers, camphor, oils, fats, waxes, and various natural and synthetic gums and resins.

Turning now to the figure, acetone is supplied through line 1 and acetaldehyde through line 2 to an aldol condensation reactor 3. In this reactor is disposed a suitable alkali metal hydroxide catalyst to promote the condensation. Alternatively, water or a dilute alkali solution may be also supplied to the reactor through line 4. About a 10% conversion of acetone is obtained in the reactor and the combined stream is passed through line 5 to a fractionator tower 6 wherein the unreacted acetone and small amounts of acetaldehyde are taken overhead and recycled through line 7 back to reactor 3. The condensation product material comprising diacetone alcohol and hydracetyl acetone along with polycondensation products are passed from the bottom of the column through line 8 to another distillation column 9 wherein diacetone alcohol (boiling at 164° C.) is distilled overhead through line 10. This material, of course, is then passed on in the conventional process for methyl isobutyl ketone production to a mesityl oxide unit where dehydration is conducted. This dehydration to mesityl oxide is conducted in the presence of traces of an added acid, or in the presence of traces of iodine. Preferably a strong mineral acid such as sulfuric acid is used; concentrations of the acid being below about 50 wt. percent, preferably in the range of 10–50 wt. percent so as to prevent undue resinification during the dehydration. Conditions are temperatures of 80° C. to 120° C., pressures of 1 to 5, preferably about 1 atmosphere. High yields are thus obtained. Following dehydration the mesityl oxide is passed to a hydrogenation unit where saturation of the double bond is obtained to produce the methyl isobutyl ketone product desired. This hydrogenation is conducted utilizing conventional hydrogenation catalysts such as platinum on alumina or nickel catalysts, preferably a 1 wt. percent platinum on alumina catalyst under temperatures of 200 to 400° C. and pressures of 1 to 5 atmospheres. High yields of above 95% are obtained.

The hydracetyl acetone (boiling at 177° C.) and heavier products are passed from the bottom of the column through line 11 to a further column 12 wherein the hydracetyl acetone is stripped from the heavier products. The heavy products are taken off the bottom of the column through line 13 and are passed from the system for use as a low quality byproduct or in other processes. It should be noted that the amount of this stream is small as compared to the desired products of the process. From the top of the tower 12 the hydracetyl acetone is passed through line 14 to a dehydrogenation reactor 15. Here dehydrogenation is conducted under vapor phase conditions at temperatures of 200 to 450° C., pressures of 0.5 to 5 atmospheres in the presence of a catalyst such as zinc oxide, bismuth oxide, preferably 94 wt. percent zinc oxide, 6% sodium carbonate on a coke carrier to obtain high yields in the order of 80 to 98 wt. percent of acetylacetone based on feed converted. Hydrogen is taken overhead through line 16 and the crude acetylacetone product is removed through line 17. This material may, of course, be further purified by distillation if chemical grade acetylacetone is required. However, the unfinished product may be used directly from the process as a deashing agent in polypropylene manufacture. Rough estimates indicate that by the process of the present invention costs for the commercial acetylacetone can be halved as compared to the price of material for competing processes. Thus, large economies are obtained over processes for preparation via condensation of methyl acetate and acetone or by the acetone-ketene-isopropenyl acetate route.

The present invention will be more clearly understood from a consideration of the following examples presenting reaction conditions to be utilized in carrying out the present process.

*Example 1*

A mixture of acetone and acetaldehyde is processed in a system as described in the figure. Thus 1 mol percent acetaldehyde based on acetone is supplied to a reactor containing .03 wt. percent solid barium hydroxide based on the total reaction mixture and the materials are reacted at 0° C. and 1 atmosphere pressure for a reaction time of 1 hour. Following reaction, the diacetone alcohol distilled overhead from the hydracetyl acetone is dehydrated in the presence of a trace amount of a 20 wt. percent sulfuric acid at temperatures of 100° C. under 1 atmosphere pressure. Following dehydration mesityl oxide is hydrogenated in the presence of 1 wt. percent platinum on alumina at a temperature of 300° C. and 3 atmospheres' pressure to obtain methyl isobutyl ketone. Returning now to the hydracetyl acetone this material after separation of small amounts of heavy condensation process products, is dehydrogenated in vapor phase at a temperature of 300° C. under 2 atomspheres' pressure in the presence of a 94 wt. percent zinc oxide 6 wt. percent sodium carbonate on a coke carrier catalyst. In the condensation step the percent yield of hydracetyl acetone based on acetaldehyde is 98% and the percent yield of diacetone alcohol based on acetone is 97%.

*Example 2*

A mixture of acetone and acetaldehyde is processed in a system as described in the figure. Thus 1.5 mol percent acetaldehyde based on acetone is supplied to a reactor containing .04 wt. percent solid sodium hydroxide based on the total reaction mixture and the materials are reacted at 10° C. and 1 atmosphere pressure for a reaction time of 1.5 hours. From this condensation step percent yield hydracetyl acetone based on acetaldehyde is 99% and percent yield of diacetone alcohol based on acetone is 98%. Following reaction these materials are further processed as described in Example 1.

What is claimed is:

1. A process for the production of hydracetyl acetone as a coproduct in a production of diacetone alcohol which comprises condensing acetone with itself and with acetaldehyde under substantially anhydrous conditions in a reaction zone at temperatures in the range of —20 to 50° C. and in the presence of a base selected from the group consisting of alkali metal hydroxides and barium hydroxide, the amount of acetaldehyde being 0.5–5 mol percent of the amount of acetone in the reaction mixture and the amount of the base being about .005 to 0.08 weight percent of the total reaction mixture, recovering acetone, hydracetyl acetone and diacetone alcohol from the condensation reaction mixture and recycling the acetone to the reaction zone.

2. The process of claim 1 in which the amount of acetaldehyde is 1–2 mol percent of the amount of acetone present in the reaction mixture.

3. A process in accordance with claim 1 wherein the condensation is carried out at a temperature of about 10° C. and said hydracetal acetone is recovered from said condensation reaction mixture in an amount less than about 5 weight percent of the recovered diacetone alcohol.

4. The process of claim 3 in which the amount of acetaldehyde is 1–2 mol percent of the amount of acetone in the reaction mixture.

References Cited in the file of this patent

UNITED STATES PATENTS 2,792,421     Dalgleish et al. _____ May 14, 1957

FOREIGN PATENTS 840,686     Germany _____ June 5, 1952